(12) United States Patent
Unnikrishnan et al.

(10) Patent No.: US 11,144,135 B2
(45) Date of Patent: Oct. 12, 2021

(54) MOUSE BUTTON WITH REPLACEABLE LEVER MECHANISM

(71) Applicant: RAZER (ASIA-PACIFIC) PTE. LTD., Singapore (SG)

(72) Inventors: Sreenath Unnikrishnan, Singapore (SG); Boon Sim Chong, Singapore (SG); Farrukh Raza Rizvi, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/627,065

(22) PCT Filed: Jun. 29, 2017

(86) PCT No.: PCT/SG2017/050325
§ 371 (c)(1),
(2) Date: Dec. 27, 2019

(87) PCT Pub. No.: WO2019/004927
PCT Pub. Date: Jan. 3, 2019

(65) Prior Publication Data
US 2020/0225776 A1    Jul. 16, 2020

(51) Int. Cl.
*G06F 3/0354* (2013.01)
*G06F 3/02* (2006.01)
*H01H 13/705* (2006.01)

(52) U.S. Cl.
CPC ........ *G06F 3/03543* (2013.01); *G06F 3/0202* (2013.01); *H01H 13/705* (2013.01); *H01H 2221/022* (2013.01); *H01H 2221/052* (2013.01)

(58) Field of Classification Search
None
See application file for complete search history.

(56) References Cited

U.S. PATENT DOCUMENTS 6,417,842 B1    7/2002  Shattuck
8,009,138 B2    8/2011  Yasutake
(Continued)

FOREIGN PATENT DOCUMENTS

JP      2012079168 A    4/2012
WO   WO 2016/086854 A1  6/2016

OTHER PUBLICATIONS

International Search Report and Written Opinion, dated Mar. 5, 2018, for the corresponding International Application No. PCT/SG2017/050325 in 10 pages.
(Continued)

*Primary Examiner* — Stephen T. Reed
(74) *Attorney, Agent, or Firm* — Polsinelli PC

(57) ABSTRACT

A computer mouse is provided to make the mouse button easily reachable without being susceptible to misclick. The computer mouse may include an electronic circuit configured to implement operations of the computer mouse. The computer mouse may include a housing enclosing the electronic circuit. The housing may include an opening on one side of the housing and a switch on the side of the housing. The computer mouse may include a magnetically active lever attached to the housing through the opening on the side of the housing. The magnetically active lever may be configured to actuate the switch on the side of the housing to interact with the electronic circuit to provide input to a computing device. The magnetically active lever may be removable from the housing and replaced with a magnetically active lever of a different size or shape.

18 Claims, 9 Drawing Sheets

(56) References Cited

U.S. PATENT DOCUMENTS

| | | |
|---|---|---|
| 8,547,334 B2 | 10/2013 | Min-Liang et al. |
| 8,692,771 B2 | 4/2014 | Min-Liang et al. |
| 9,128,539 B2 | 9/2015 | Ng |
| 9,201,518 B2 | 12/2015 | Wang |
| 2007/0211030 A1 | 9/2007 | Hong et al. |
| 2009/0046062 A1 | 2/2009 | Sayyadi et al. |
| 2010/0231514 A1* | 9/2010 | Min-Liang .......... G06F 3/03543 345/163 |
| 2011/0141018 A1 | 6/2011 | Du et al. |
| 2015/0109208 A1* | 4/2015 | Wang .................. G06F 3/03543 345/163 |
| 2017/0192536 A1* | 7/2017 | Wang .................. G06F 3/03543 |
| 2019/0220107 A1* | 7/2019 | Odgers ............... G06F 3/03543 |

OTHER PUBLICATIONS

Xbox Elite Wireless Controller, http://www.xbox.com/en-SG/xbox-one/accessories/controllers/elite-wireless-controller, in 8 pages.
Infinity4PS PRO PS4 Controller, SCUF Gaming, https://scufgaming.com/s/infinity4ps/, in 8 pages.
"Logitech G900 Chaos Spectrum Review—The best wireless mouse ever?" https://www.youtube.com/watch?v=D1o2HBm_uNk, Apr. 1, 2016 in 6 pages.

* cited by examiner

MOUSE BUTTON WITH REPLACEABLE LEVER MECHANISM

TECHNICAL FIELD

Various aspects of this disclosure generally relate to a computer mouse.

BACKGROUND

A computer mouse is an input device that detects two-dimensional motion relative to a surface. The two-dimensional motion may be translated into the motion of a pointer on a display, which allows a smooth control of the graphical user interface of a computing device.

Gaming mouses are specifically designed for use in computer games. They typically employ a wide array of controls and buttons and have designs that differ radically from traditional computer mouses. It is also common for gaming mouses, especially those designed for use in real-time strategy games or in multiplayer online battle arena games, to have a relatively high sensitivity, measured in dots per inch (DPI). Some advanced mouses from gaming manufacturers also allow users to customize the weight of the mouse by adding or subtracting weights to allow for easier control. Ergonomic quality is also an important factor in gaming mouses, as extended gameplay times may render further use of the mouse to be uncomfortable. Some mouses have been designed to have adjustable features such as removable and/or elongated palm rests, horizontally adjustable thumb rests and pinky rests. Some mice may include several different rests with their products to ensure comfort for a wider range of target consumers Customizable buttons for gaming mouses have been around for a while. For example, sliding buttons are used on gaming mouses to let the user pick the position for the buttons so the buttons are most comfortable to use. However, sliding mechanisms make the buttons less steady than if they were fixed in one place on the mouse. Therefore, it may be desirable to customize the mouse buttons with no negative effect on the stability of the button.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

This disclosure aims to make the mouse button easily reachable without being susceptible to misclick. A lever mechanism is adopted to achieve this objective. The lever mechanism may be reconfigured with different sized levers to account for as many hand-sizes and finger lengths as possible.

In an aspect of the disclosure, a computer mouse is provided. The computer mouse may include an electronic circuit configured to implement operations of the computer mouse. The computer mouse may include a housing enclosing the electronic circuit. The housing may include an opening on one side of the housing and a switch on the same side of the housing. The computer mouse may include a magnetically active lever attached to the housing through the opening on the side of the housing. The magnetically active lever may be configured to actuate the switch on the side of the housing to interact with the electronic circuit to provide input to a computing device.

In another aspect of the disclosure, a method of operating a computer mouse is provided. The computer mouse may be coupled to a computing device. The method may attach a magnetically active lever to a housing of the computer mouse through an opening on one side of the housing. The housing may enclose an electronic circuit configured to implement operations of the computer mouse. The method may actuate, by using the magnetically active lever, a switch on the side of the housing to interact with the electronic circuit to provide input to the computing device.

In one embodiment, the magnetically active lever may be removable from the housing. In one embodiment, the computer mouse may further include a magnet enclosed within the housing. The magnet may be affixed to the housing. In one embodiment, one end of the magnetically active lever may form a mechanical interlock with the housing using the opening on the side of the housing. In one embodiment, a surface of the end may enter into the housing through the opening and magnetically attach to a surface of the magnet within the housing. In one embodiment, the end may act as a fulcrum of the magnetically active lever.

In one embodiment, the magnetically active lever may apply a force to the switch on the side of the housing through a protrusion between two ends of the magnetically active lever. In one embodiment, the contact between the protrusion and the switch may generate the input to the computing device. In one embodiment, the switch may be a micro switch, a tact switch, or a metal dome switch, or any other on/off switch. In one embodiment, the magnetically active lever may be replaceable with a second magnetically active lever of a different size and/or shape.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1B:
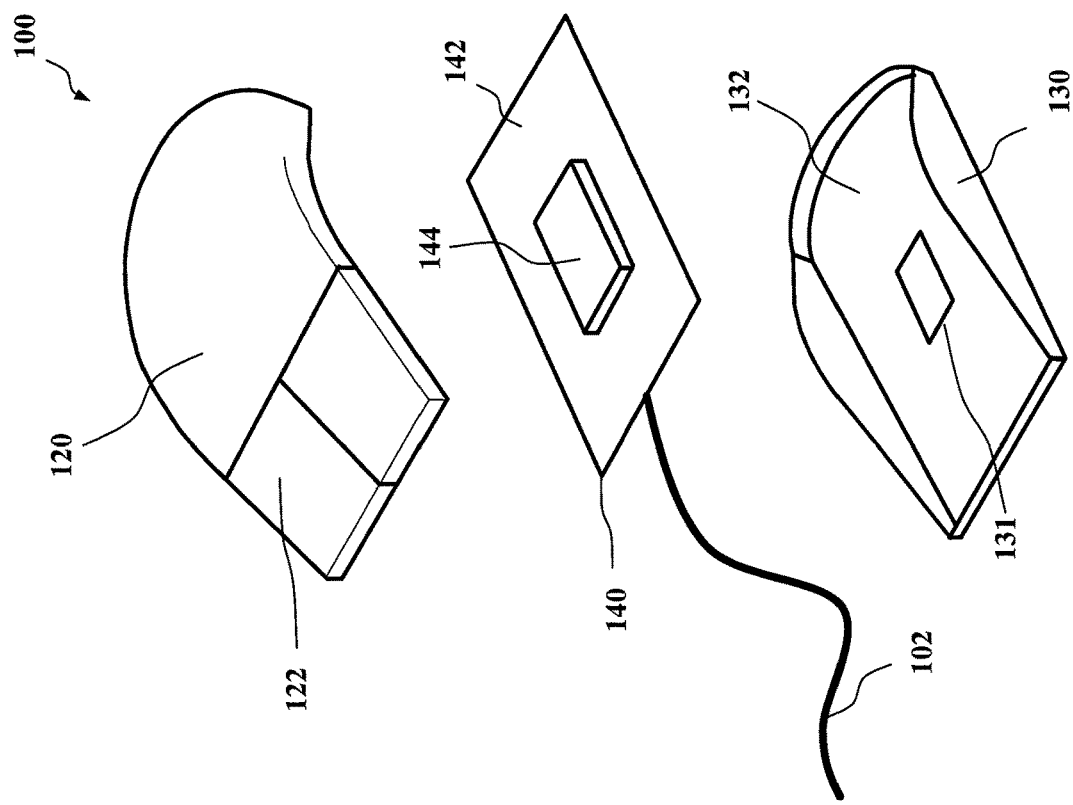
FIG. 1B is a diagram showing an exploded view of the computer mouse of FIG. 1A according to various embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer mouses will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media may include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

To enhance user experience, in one embodiment, a mouse button customized with replaceable lever mechanism is provided. The levers used in the lever mechanism may be of different sizes to affect the reach of the mouse button. There is no negative effect on the stability of the mouse button, unlike with sliding mechanisms or other kinds of mechanisms of customizability. This mouse button may give users the benefits of a customized mouse button while also being steady and providing optimal tactile feel. Users may easily remove and reattach levers of different sizes according to their preference to find the optimal reach for the mouse button, so that the mouse button is neither difficult to reach nor susceptible to accidental actuation. The replaceable lever allows for users with different hand sizes and grips to use the button optimally. The lever may be removed entirely if it proves to be an obstruction for the user and a protection cap may be used in place of the lever to close the opening on the housing of the computer mouse.

Figure 1A:
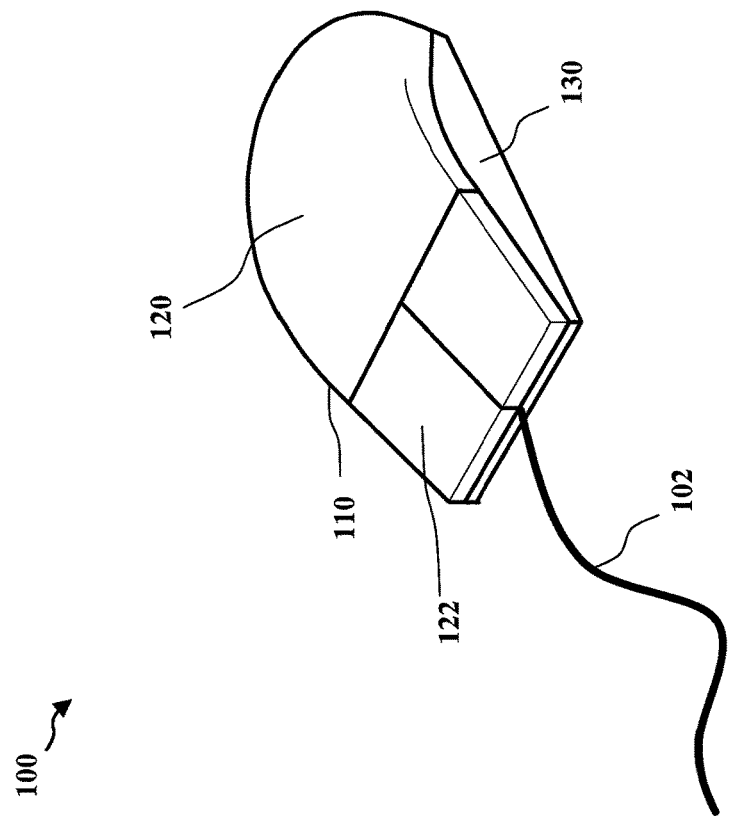
FIG. 1A is a diagram showing an assembled view of a computer mouse for communication with a processor-based device according to various embodiments.

FIG. 1A is a diagram showing an assembled view of a computer mouse 100 for communication with a processor-based device according to various embodiments. FIG. 1B is a diagram showing an exploded view of the computer mouse 100 of FIG. 1A according to various embodiments. As shown, the mouse 100 may include a housing 110. The housing 110 may be an exterior casing of the mouse 100. Further, the housing 110 may include a cover portion 120 and a base portion 130. The cover portion 120 and the base portion 130 may be two separate parts of the housing 110. The cover portion 120 of the housing 110 may be a top case cover of the exterior casing of the mouse 100. The base portion 130 of the housing 110 may be a bottom case cover of the exterior casing of the mouse 100. According to various embodiments, when the cover portion 120 and the base portion 130 are assembled together, the housing 110 may define an inner cavity to house or encase internal components 140 of the mouse 100.

According to various embodiments, the internal components 140 of the mouse 100 may include an electronic circuit module 142 and a motion detection module 144. The electronic circuit module 142 may include printed circuit boards, or any other suitable electronic circuit. The electronic circuit module 142 may be connected to the processor-based device, such as a computer, via a cable 102. The motion detection module 144 may include optical sensors, or laser sensors, or track ball mechanism, or any other electronic or mechanical components that may be configured to detect movement of the mouse 100. The motion detection module 144 may further be configured to be in communication with the electronic circuit module 142 such that the detected movement of the mouse may be transmitted to the processor-based device, which the mouse 100 may be connected to.

Further, the cover portion 120 of the housing 110 may include one or more buttons 122. The one or more buttons 122 may be configured to interact with the electronic circuit module 142 of the mouse 100 for a user to provide inputs to the processor-based device, to which the mouse 100 may be connected, via clicking of the one or more buttons 122 of the mouse 100. The one or more buttons 122 may include a click button, or a scroll button, or a push button, or any combination of suitable buttons. The one or more buttons 122 may be located at any region of the cover portion 120 as desired.

According to various embodiments, the housing 110 may include a base surface. The base surface may be configured to face a tracking surface on which the mouse 100 may be placed on. Accordingly, the base surface of the housing 110 may be an exterior surface of a substantially flat section 132 of the base portion 130 of the housing 110. Thus, the mouse 100 may be placed with the base surface of the base portion 130 of the housing 110 substantially flat against or substantially parallel to a mouse pad, a table top, or any other suitable tracking surfaces on which the mouse may be used.

According to various embodiments, the base portion 130 of the housing 110 may include a window 131. The window 131 may be an opening or a transparent portion of the base portion 130. Accordingly, the window 131 may allow the motion detection module 144 to detect relative movement between the mouse 100 and the tracking surface on which the mouse 100 may be placed and moved.

Figure 2:
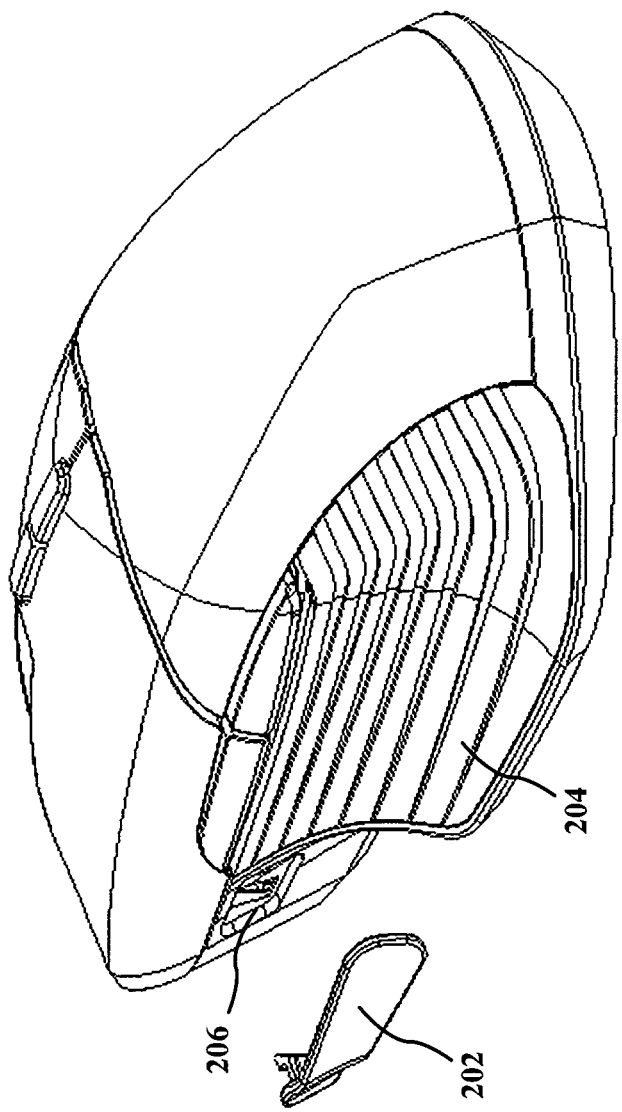
FIG. 2 is a diagram illustrating an example of a computer mouse with a magnetically active lever detached.

FIG. 2 is a diagram illustrating an example of a computer mouse 200 with a magnetically active lever 202 detached. In one embodiment, the mouse 200 may be the mouse 100 described above with reference to FIG. 1. In one embodiment, the magnetically active lever 202 may at least partially consist of metal (e.g., ferromagnetic materials). In one embodiment, there may be an opening 206 on a side 204 of the housing of the mouse 200. The magnetically active lever 202 may be attached to the mouse 200 through the opening 206. In one embodiment, the side 204 may be substantially perpendicular to the substantially flat section (e.g., 132) of the base portion (e.g., 130) of the mouse 200.

Figure 3:
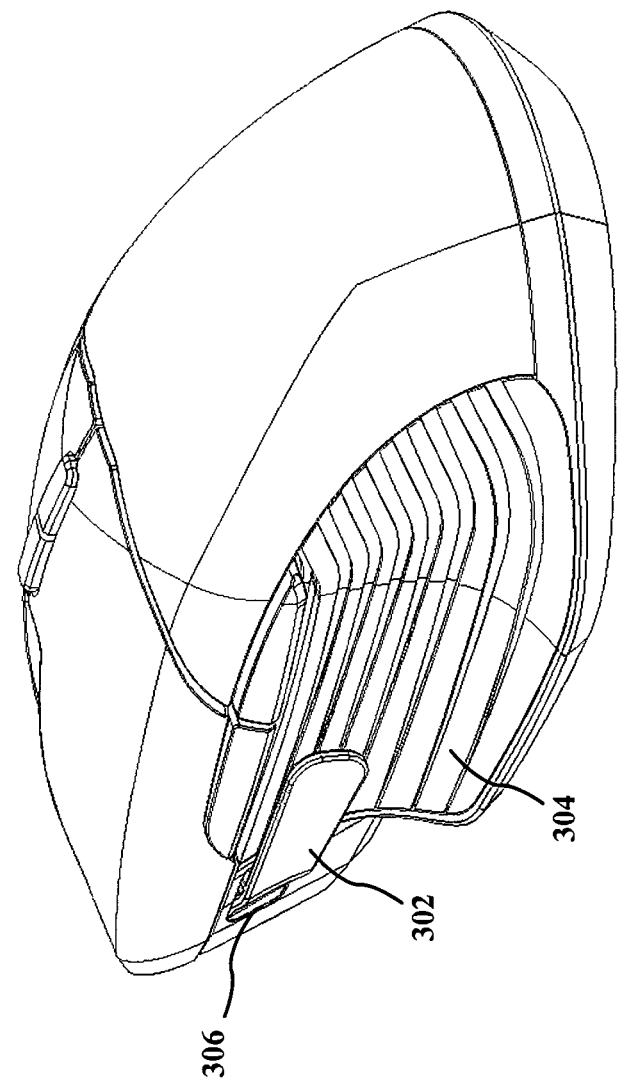
FIG. 3 is a diagram illustrating an example of a computer mouse attached with a magnetically active lever.

FIG. 3 is a diagram illustrating an example of a computer mouse 300 attached with a magnetically active lever 302. In one embodiment, the mouse 300 may be the mouse 200 described above with reference to FIG. 2, and the magnetically active lever 302 may be the magnetically active lever 202 described above with reference to FIG. 2. In one embodiment, the magnetically active lever 302 may be attached to the side 304 of the housing of the mouse 300 through an opening 306 on the side 304 of the housing. In one embodiment, the side 304 may be substantially perpendicular to the substantially flat section (e.g., 132) of the base portion (e.g., 130) of the mouse 300.

Figure 4:
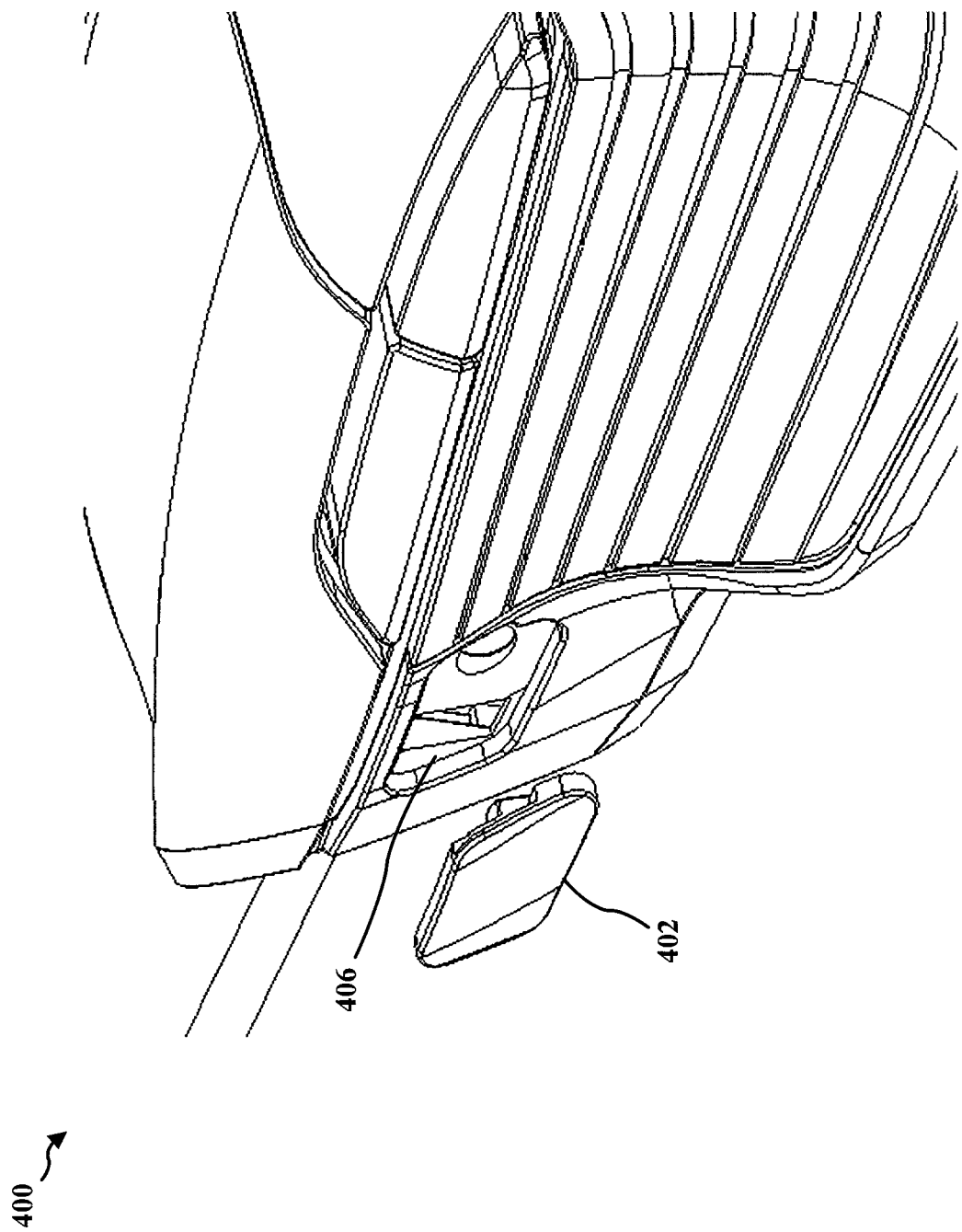
FIG. 4 is a diagram illustrating an example of a protection cap that may be used on a computer mouse.

FIG. 4 is a diagram illustrating an example of a protection cap 402 that may be used on a computer mouse 400. In one embodiment, the mouse 400 may be the mouse 200 described above with reference to FIG. 2. In one embodiment, there may be an opening 406 on a side of the housing of the mouse 400. In one embodiment, the opening 406 may be the opening 206 described above with reference to FIG. 2. In one embodiment, if a lever (e.g., the magnetically active lever 202 or 302) is not attached to the computer mouse 400, the protection cap 402 may be attached to the side of the housing of the mouse 400 through the opening 406. As a result of attaching the protection cap 402 to the mouse 400, the opening 406 on the housing of the mouse 400 is closed.

Figure 5:
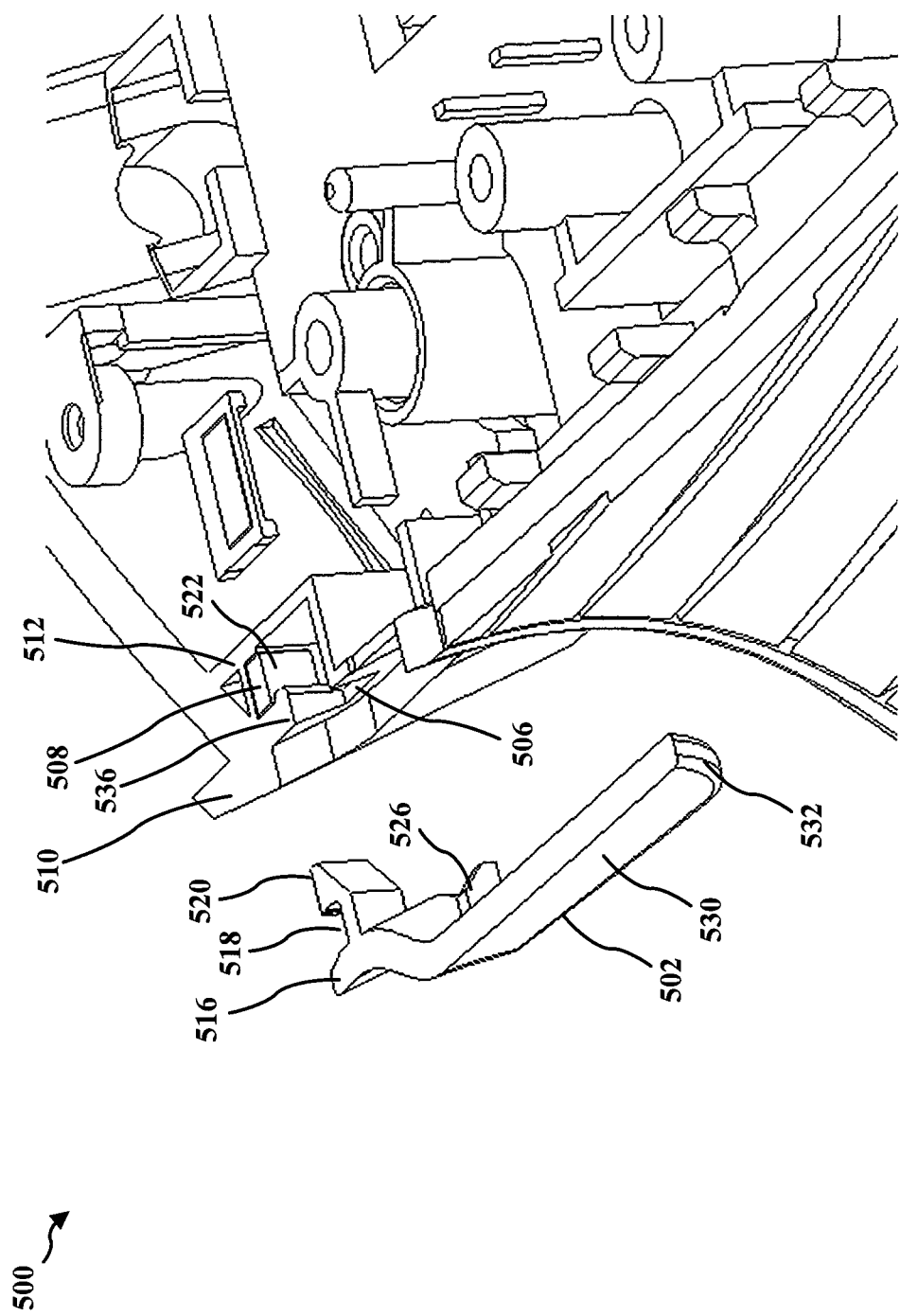
FIG. 5 is a diagram illustrating an example of an enlarged view of a computer mouse with a magnetically active lever detached.

FIG. 5 is a diagram illustrating an example of an enlarged view of a computer mouse 500 with a magnetically active lever 502 detached. In one embodiment, the mouse 500 may be the mouse 200 described above with reference to FIG. 2, and the magnetically active lever 502 may be the magnetically active lever 202 described above with reference to FIG. 2.

The mouse 500 may have a housing 510 that encloses internal components of the mouse 500. In one embodiment, the housing 510 may be made with plastic. In one embodiment, there may be an opening 506 on one side of the housing 510. The magnetically active lever 502 may be attached to the mouse 500 through the opening 506.

The mouse 500 may include a magnet 508 enclosed within the housing 510. In one embodiment, the magnet 508 may be affixed to the housing 510 directly, e.g., through a structure 512 that is an integral part of the housing 510. In one embodiment, the magnet 508 may be affixed to the housing 510 indirectly, e.g., through another component that is affixed to the housing 510. The magnet 508 may include a magnetic surface 522 that pulls on other ferromagnetic materials and attracts other magnetic surfaces of opposite magnetic poles.

The mouse 500 may include a switch (not shown) on the housing 510. In one embodiment, the switch may be a micro switch, a tact switch, or a metal dome switch, or any other on/off switch. The switch may be actuated to generate input to a computing device. For example, the switch may be pressed to select or interact with an element of a graphical user interface, producing a distinctive clicking sound, etc.

The magnetically active lever 502 may include a beam 530, which has an attaching end 516 and a regular end 532. The attaching end 516 may have a cavity 518 and a magnetic surface 520. In one embodiment, the cavity 518 may fit snugly with a section 536 of the housing 510 to attach the magnetically active lever 502 to the mouse 500. The section 536 may form part of the opening 506. The magnetic surface 520 of the magnetically active lever 502 may attract the magnetic surface 522 of the magnet 508 to attach the magnetically active lever 502 to the mouse 500.

The magnetically active lever 502 may include a protrusion 526 on the beam 530. The protrusion 526 may be located between the attaching end 516 and the regular end 532. When the magnetically active lever 502 is attached to the mouse 500, the protrusion 526 may be able to contact the switch to actuate the switch, thus providing an input signal to the computing device coupled to the mouse 500.

Figure 6:
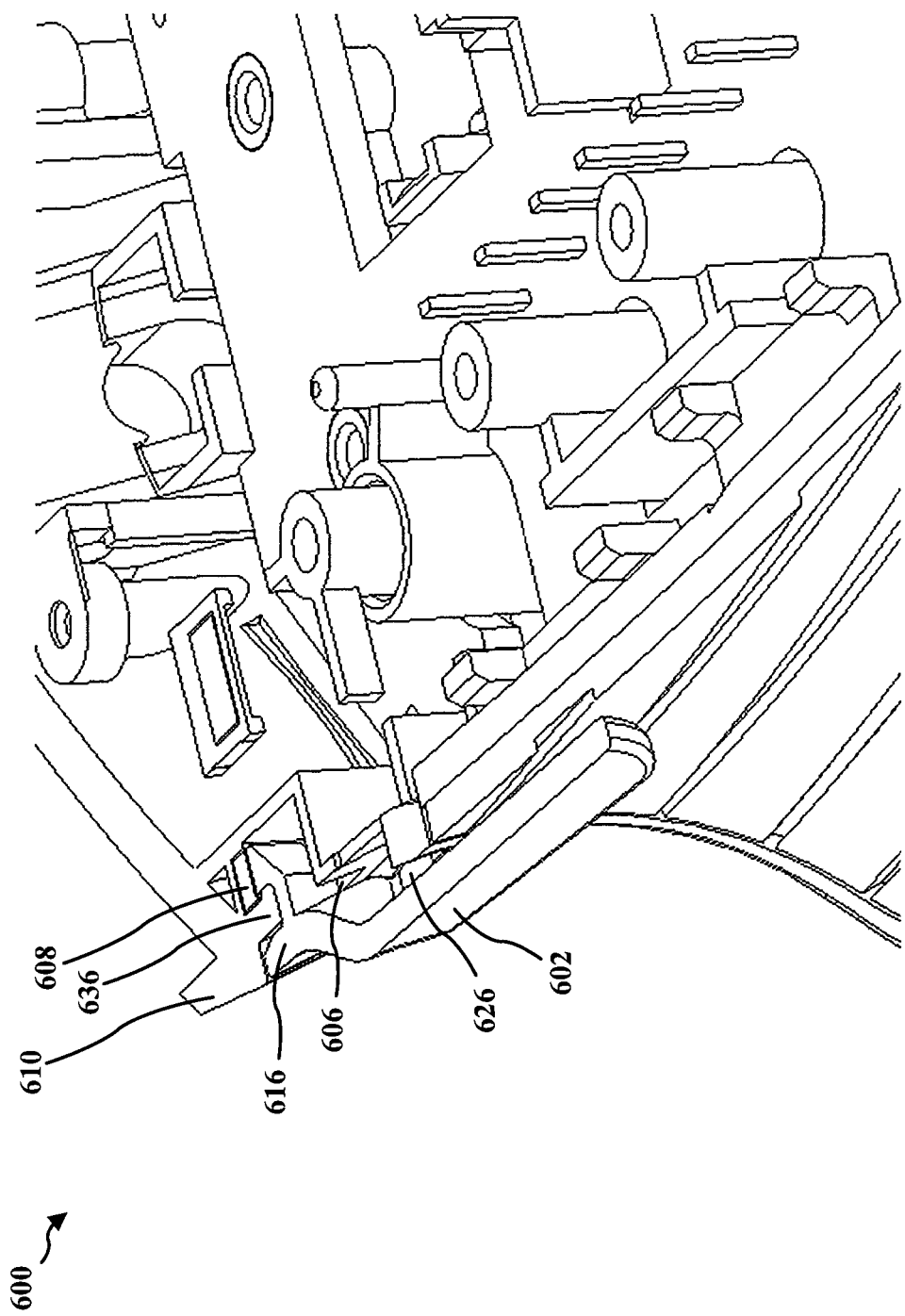
FIG. 6 is a diagram illustrating an example of an enlarged view of a computer mouse attached with a magnetically active lever.

FIG. 6 is a diagram illustrating an example of an enlarged view of a computer mouse 600 attached with a magnetically active lever 602. In one embodiment, the mouse 600 may be the mouse 500 described above with reference to FIG. 5, and the magnetically active lever 602 may be the magnetically active lever 502 described above with reference to FIG. 5.

In one embodiment, the magnetically active lever 602 may be attached to the mouse 600 through an opening 606 on the housing 610 of the mouse 600. The mouse 600 may include a magnet 608 enclosed within the housing 610.

The magnetically active lever 602 may include an attaching end 616. In one embodiment, the cavity of the attaching end 616 may fit snugly with a section 636 of the housing 610 to attach the magnetically active lever 602 to the mouse 600. The section 636 may form part of the opening 606. In one embodiment, the attaching end 616 may form a mechanical interlock with the section 636. A magnetic surface (e.g., 620) of the attaching end 616 may attract a magnetic surface (e.g., 622) of the magnet 608 to attach the magnetically active lever 602 to the mouse 600. In one embodiment, the coupling of the two magnetic surfaces (e.g., 620 and 622) may occur within the housing 610. When the magnetically active lever 602 is attached to the mouse 600, the attaching end 616 may act as a fulcrum of the lever.

The mouse 600 may include a switch (not shown) on the housing 610. The switch may be actuated to generate input to a computing device. The magnetically active lever 602 may include a protrusion 626. When the magnetically active lever 602 is attached to the mouse 600, the protrusion 626 may make contact with the switch to actuate the switch, thus providing an input signal to the computing device coupled to the mouse 600. In one embodiment, a user may apply force to any section of the magnetically active lever 602 to cause the protrusion 626 to make contact with the switch.

Figure 7:
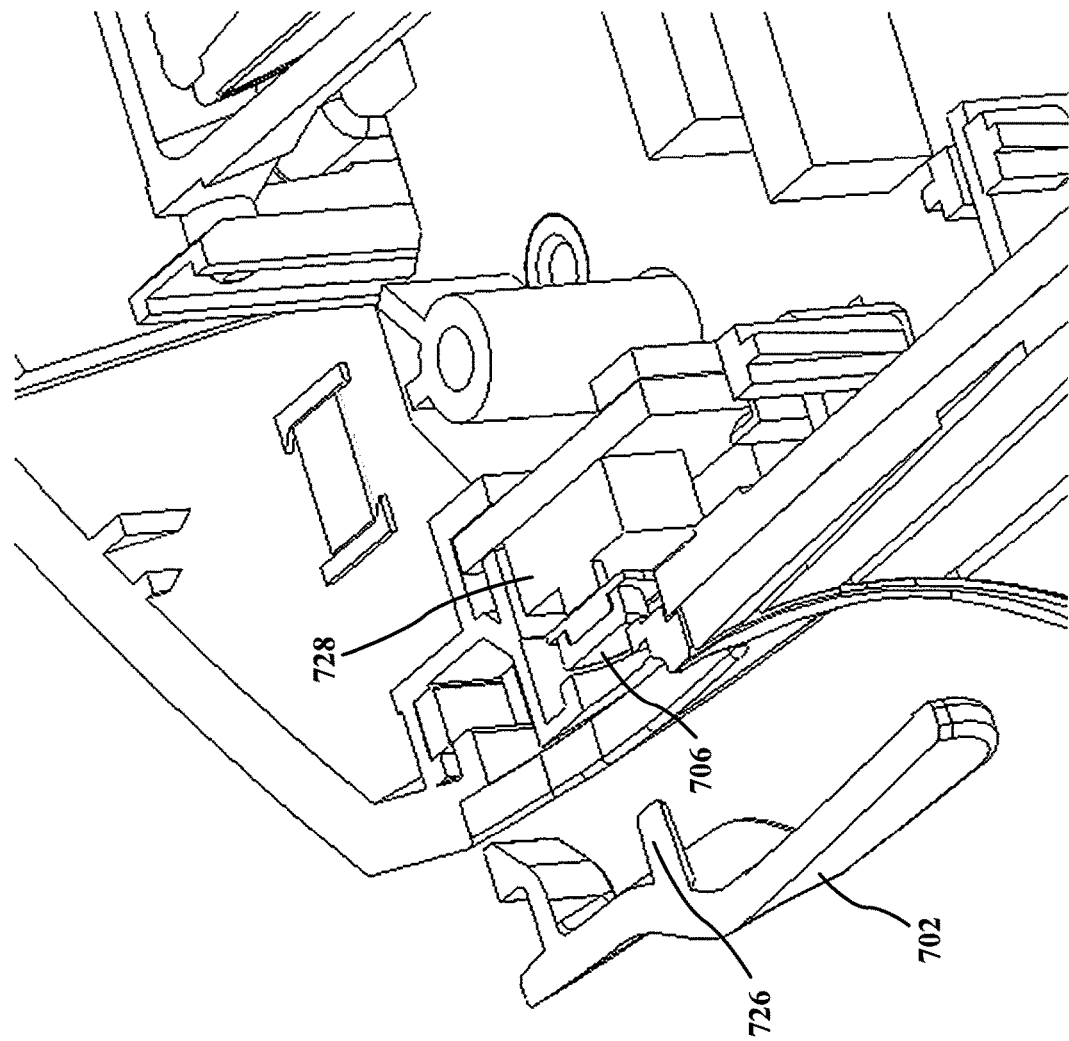
FIG. 7 is a diagram illustrating another example of an enlarged view of a computer mouse with a magnetically active lever detached.

FIG. 7 is a diagram 700 illustrating another example of an enlarged view of a computer mouse 700 with a magnetically active lever 702 detached. In one embodiment, the mouse 700 may be the mouse 500 or 600 described above, and the magnetically active lever 702 may be the magnetically active lever 502 or 602 described above.

The mouse 700 may include a switch 728. In one embodiment, the switch 728 may be the switch described above in FIG. 5 or 6. The switch 728 may be actuated to generate input to a computing device. The switch 728 may include a cushioning cap 706.

The magnetically active lever 702 may include a protrusion 726. When the magnetically active lever 702 is snapped on to the mouse 700, the protrusion 726 may make contact with the cushioning cap 706. When the magnetically active lever 702 is pressed, the switch 728 may be actuated through the cushioning cap 706, thus providing an input signal to the computing device coupled to the mouse 700. In one embodiment, a user may apply force to any section of the magnetically active lever 702 to cause the protrusion 726 to actuate the switch 728.

Figure 8:
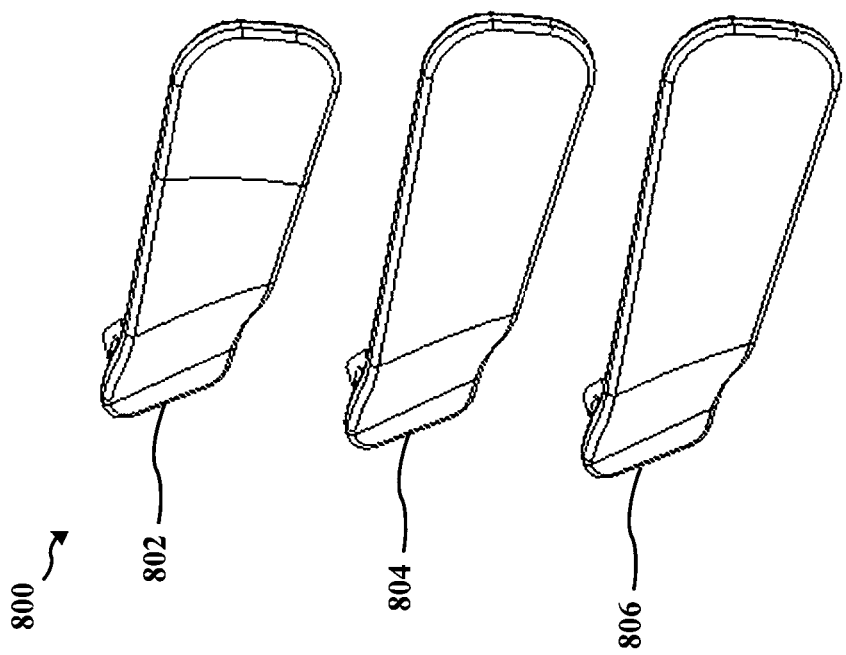
FIG. 8 is a diagram illustrating examples of magnetically active levers in different sizes that may be attached to a computer mouse described above with references to FIGS. 2-7.

FIG. 8 is a diagram 800 illustrating examples of magnetically active levers in different sizes that may be attached to a computer mouse described above with references to FIGS. 2-7. Three different magnetically active levers 802, 804, and 806 are shown in FIG. 8. Each of the magnetically active levers 802, 804, and 806 is of a different size from the others. Each of the magnetically active levers 802, 804, and 806 may be attached to a computer mouse. Each of the magnetically active levers 802, 804, and 806 may be removed from the computer mouse, and replaced with another magnetically active lever with a different size and/or shape.

In one embodiment, the size and/or shape of a magnetically active lever may be customized for a particular user. The replaceable lever allows for users with different hand sizes and grips to use the button optimally. By using a computer mouse attached with the customized magnetically active lever, the user experience of the particular user may be improved.

In one embodiment, a computer mouse may be reconfigurable with magnetically active levers of different size and/or shape as long as the attaching head (e.g., 516 or 616) of each of the magnetically active levers fits the mechanical interlock mechanism of the computer mouse and the protrusion on each of the magnetically active levers is able to actuate the switch (e.g., 728) when the magnetically active lever is attached to the computer mouse. In one embodiment, to fit the mechanical interlock mechanism of the computer mouse, the attaching head may need to fit snugly with a section (e.g., 536 or 636) that forms the opening on the housing of the computer mouse, and a surface of the attaching head may need to magnetically attach/couple to a surface of the magnet within the housing of the computer mouse.

Figure 9:
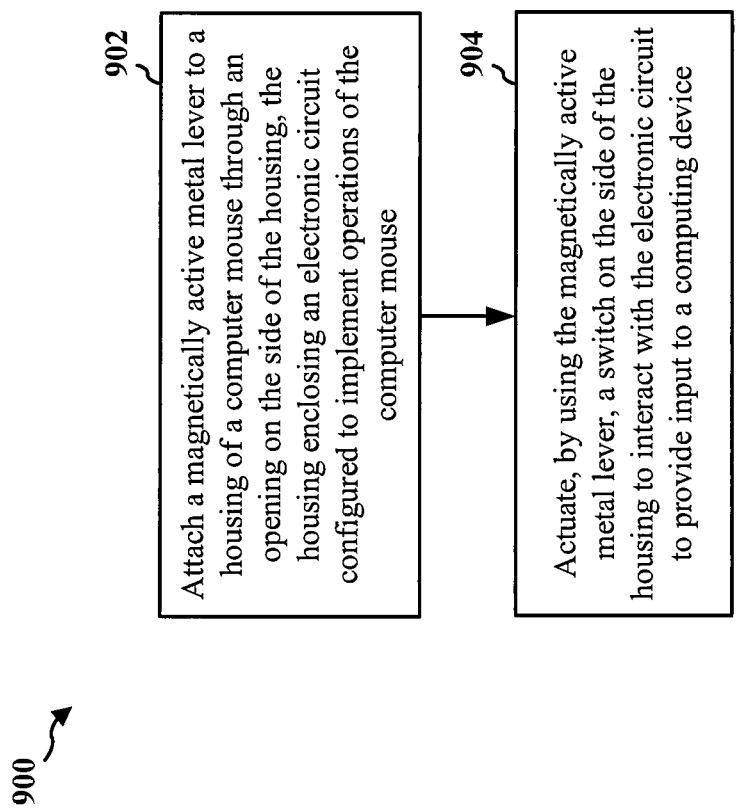
FIG. 9 is a flowchart of a method of operating a computer mouse.

FIG. 9 is a flowchart 900 of a method of operating a computer mouse. The computer mouse may be coupled to a computing device. In one embodiment, the computer mouse may be the computer mouses described above with reference to FIGS. 2-7.

At 902, the method may attach a magnetically active metal lever to a housing of the computer mouse through an opening on one side of the housing. The housing may enclose an electronic circuit configured to implement operations of the computer mouse. In one embodiment, the magnetically active lever may be removable from the housing. In one embodiment, the magnetically active lever may be replaceable with a second magnetically active lever of a different size and/or shape.

In one embodiment, the housing may further encloses a magnet. The magnet may be directly or indirectly affixed to the housing. In one embodiment, one end of the magnetically active lever may form a mechanical interlock with the housing using the opening on the side of the housing. In one embodiment, a surface of the end may enter into the housing through the opening and magnetically attach/couple to a surface of the magnet within the housing. In one embodiment, the end may act as a fulcrum of the magnetically active lever.

At 904, the method may actuate, by using the magnetically active metal lever, a switch on the side of the housing to interact with the electronic circuit to provide input to the computing device. In one embodiment, the magnetically active lever may apply a force to the switch on the side of the housing through a protrusion between two ends of the magnetically active lever. In one embodiment, the contact between the protrusion and the switch may generate the input to the computing device. In one embodiment, the switch may be a micro switch, a tact switch, or a metal dome switch, or any other on/off switch.

In the following, various aspects of this disclosure will be illustrated:

Example 1 is computer mouse. The computer mouse may include an electronic circuit configured to implement operations of the computer mouse. The computer mouse may include a housing enclosing the electronic circuit. The housing may include an opening on one side of the housing and a switch on the same side of the housing. The computer mouse may include a magnetically active lever attached to the housing through the opening on the side of the housing. The magnetically active lever may be configured to actuate the switch on the side of the housing to interact with the electronic circuit to provide input to a computing device.

In Example 2, the subject matter of Example 1 may optionally include that the magnetically active lever may be removable from the housing.

In Example 3, the subject matter of any one of Examples 1 to 2 may optionally include that the computer mouse may further include a magnet enclosed within the housing. The magnet may be directly or indirectly affixed to the housing.

In Example 4, the subject matter of any one of Examples 1 to 3 may optionally include that an end of the magnetically active lever may form a mechanical interlock with the housing using the opening on the side of the housing.

In Example 5, the subject matter of Example 4 may optionally include that a surface of the end may enter into the housing through the opening and magnetically attach to a surface of the magnet within the housing.

In Example 6, the subject matter of Example 4 may optionally include that the end may act as a fulcrum of the magnetically active lever.

In Example 7, the subject matter of any one of Examples 1 to 6 may optionally include that the magnetically active lever may apply a force to the switch on the side of the housing through a protrusion between two ends of the magnetically active lever.

In Example 8, the subject matter of Example 7 may optionally include that a contact between the protrusion and the switch may generate the input to the computing device.

In Example 9, the subject matter of any one of Examples 1 to 8 may optionally include that the switch may be a micro switch, a tact switch, or a metal dome switch, or any other on/off switch.

In Example 10, the subject matter of any one of Examples 1 to 9 may optionally include that the magnetically active lever may be replaceable with a second magnetically active lever of a different size and/or shape.

Example 11 is a method of operating a computer mouse. The method may attach a magnetically active lever to a housing of the computer mouse through an opening on one side of the housing. The housing may enclose an electronic circuit configured to implement operations of the computer mouse. The method may actuate, by using the magnetically active lever, a switch on the side of the housing to interact with the electronic circuit to provide input to a computing device.

In Example 12, the subject matter of Example 11 may optionally include that the magnetically active lever may be removable from the housing.

In Example 13, the subject matter of any one of Examples 11 and 12 may optionally include that the housing may further enclose a magnet. The magnet may be directly or indirectly affixed to the housing.

In Example 14, the subject matter of any one of Examples 11 to 13 may optionally include that an end of the magnetically active lever may form a mechanical interlock with the housing using the opening on the side of the housing.

In Example 15, the subject matter of Example 14 may optionally include that a surface of the end may enter into the housing through the opening and magnetically attach to a surface of the magnet within the housing.

In Example 16, the subject matter of Example 14 may optionally include that the end may act as a fulcrum of the magnetically active lever.

In Example 17, the subject matter of any one of Examples 11 to 16 may optionally include that the magnetically active lever may apply a force to the switch on the side of the housing through a protrusion between two ends of the magnetically active lever.

In Example 18, the subject matter of Example 17 may optionally include that a contact between the protrusion and the switch may generate the input to the computing device.

In Example 19, the subject matter of any one of Examples 11 to 18 may optionally include that the switch may be a micro switch, a tact switch, or a metal dome switch, or any other on/off switch.

In Example 20, the subject matter of any one of Examples 11 to 19 may optionally include that the magnetically active lever may be replaceable with a second magnetically active lever of a different size and/or shape.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A computer mouse, comprising:
   an electronic circuit configured to implement operations of the computer mouse;
   a housing enclosing the electronic circuit, the housing comprising an opening on a side of the housing and a switch on the side of the housing, the side of the housing facing a thumb of a user's hand resting on the computer mouse; and
   a magnetically active lever attached to the housing through the opening, wherein the magnetically active lever is configured to actuate the switch on the side of the housing to interact with the electronic circuit to provide input to a computing device,
   wherein the magnetically active lever applies a force to the switch on the side of the housing through a protrusion that is integrally formed with the magnetically active lever between two ends of the magnetically active lever.

2. The computer mouse of claim 1, wherein the magnetically active lever is removable from the housing.

3. The computer mouse of claim 1, further comprising a magnet enclosed within the housing, the magnet affixed to the housing.

4. The computer mouse of claim 3, wherein an end of the magnetically active lever forms a mechanical interlock with the housing using the opening on the side of the housing.

5. The computer mouse of claim 4, wherein a surface of the end of the magnetically active lever enters into the housing through the opening on the side of the housing and magnetically attaches to a surface of the magnet within the housing.

6. The computer mouse of claim 4, wherein the end of the magnetically active lever acts as a fulcrum of the magnetically active lever.

7. The computer mouse of claim 1, wherein a contact between the protrusion and the switch generates the input to the computing device.

8. The computer mouse of claim 1, wherein the switch is one of a micro switch, a tact switch, or a metal dome switch.

9. The computer mouse of claim 1, wherein the magnetically active lever is replaceable with a second magnetically active lever of at least one of a different size and shape.

10. A method of operating a computer mouse, the method comprising:
attaching a magnetically active lever to a housing of the computer mouse through an opening on a side of the housing, the side of the housing facing a thumb of a user's hand resting on the computer mouse, and the housing enclosing an electronic circuit configured to implement operations of the computer mouse; and
actuating, by using the magnetically active lever, a switch on the side of the housing to interact with the electronic circuit to provide input to a computing device;
wherein the magnetically active lever applies a force to the switch on the side of the housing through a protrusion that is integrally formed with the magnetically active lever between two ends of the magnetically active lever.

11. The method of claim 10, wherein the magnetically active lever is removable from the housing.

12. The method of claim 10, wherein the housing further encloses a magnet, the magnet affixed to the housing.

13. The method of claim 12, wherein an end of the magnetically active lever forms a mechanical interlock with the housing using the opening on the side of the housing.

14. The method of claim 13, wherein a surface of the end of the magnetically active lever enters into the housing through the opening on the side of the housing and magnetically attaches to a surface of the magnet within the housing.

15. The method of claim 13, wherein the end of the magnetically active lever acts as a fulcrum of the magnetically active lever.

16. The method of claim 10, wherein a contact between the protrusion and the switch generates the input to the computing device.

17. The method of claim 10, wherein the switch is one of a micro switch, a tact switch, or a metal dome switch.

18. The method of claim 10, wherein the magnetically active lever is replaceable with a second magnetically active lever of at least one of a different size and shape.

* * * * *